(12) United States Patent
Tang et al.

(10) Patent No.: US 11,645,842 B2
(45) Date of Patent: May 9, 2023

(54) METHOD FOR TRACING POLLUTION AT DRAINAGE OUTLET OF CULVERT

(71) Applicant: PowerChina Huadong Engineering Corporation Limited, Zhejiang (CN)

(72) Inventors: Yingdong Tang, Zhejiang (CN); Yuhang Shao, Zhejiang (CN); Shaohua Lou, Zhejiang (CN)

(73) Assignee: PowerChina Huadong Engineering Corporation Limited, Hangzhou (CN)

( * ) Notice: Subject to any disclaimer, the term of this patent is extended or adjusted under 35 U.S.C. 154(b) by 229 days.

(21) Appl. No.: 17/193,108

(22) Filed: Mar. 5, 2021

(65) Prior Publication Data

US 2022/0147740 A1 May 12, 2022

(30) Foreign Application Priority Data

Nov. 11, 2020 (CN) .......................... 202011251147.X

(51) Int. Cl.
*G06V 20/00* (2022.01)
*G06V 20/64* (2022.01)
*G06V 10/88* (2022.01)

(52) U.S. Cl.
CPC .............. *G06V 20/38* (2022.01); *G06V 10/88* (2022.01); *G06V 20/64* (2022.01)

(58) Field of Classification Search
CPC ........ G06V 20/38; G06V 20/64; G06V 10/88; G06V 20/35; G06V 20/50; G06V 20/60; G06V 20/52; Y02A 20/00; Y02A 20/108; Y02A 20/152; Y02A 20/20; E03F 5/14; E03F 5/10; E03F 3/02; E03F 5/101; E03F 2201/00; E03F 2201/10; E03F 2201/20; C02F 2103/00; C02F 2103/001; C02F 1/001; G06Q 50/10; G06Q 50/26; G06Q 10/06; G06Q 10/063; G06Q 10/0635; G01B 11/00; G01B 11/24; G01N 33/00; G01N 27/00; G01N 33/18; G01S 19/38; G01S 19/39; G01S 19/42; G01D 21/00; G01D 21/02
See application file for complete search history.

(56) References Cited

U.S. PATENT DOCUMENTS

2022/0147740 A1\* 5/2022 Tang .................... G06V 10/88

FOREIGN PATENT DOCUMENTS

| CN | 107274323 | A |  | 10/2017 |  |  |
|---|---|---|---|---|---|---|
| CN | 107274323 | A1 | \* | 10/2017 | ............. | G06Q 50/26 |
| CN | 108362356 | A |  | 8/2018 |  |  |
| CN | 108362356 | A1 | \* | 8/2018 | ................ | E03F 3/02 |
| CN | 110456103 | B1 | \* | 6/2019 | ............. | G01N 33/18 |
| CN | 111667168 | A |  | 9/2020 |  |  |
| CN | 112525255 | A | \* | 3/2021 | ............. | G01B 11/24 |
| CN | 113702997 | A | \* | 11/2021 |  |  |
| KR | 101442759 | B1 | \* | 9/2014 | ............. | F16L 55/26 |

\* cited by examiner

*Primary Examiner* — Gandhi Thirugnanam

(57) ABSTRACT

A method for tracing pollution at a drainage outlet of a culvert. (1) The main line of the culvert is fully detected through an inspection robot to obtain the image data, water quality data, coordinates and other basic data of the outlet. (2) The type of the outlet is determined according to the data information obtained in step (1). (3) Pollutants in the drainage outlet with suspected rainwater-sewage connection are traced, and sources of the pollutants flowing to the outlet are all located.

5 Claims, 5 Drawing Sheets

METHOD FOR TRACING POLLUTION AT DRAINAGE OUTLET OF CULVERT

CROSS-REFERENCE TO RELATED APPLICATIONS

This application claims the benefit of priority from Chinese Patent Application No. 202011251147.X, filed on Nov. 11, 2020. The content of the aforementioned application, including any intervening amendments thereto, is incorporated herein by reference in its entirety.

TECHNICAL FIELD

This application relates to drainage system, and more particularly to a method for tracing pollution at a drainage outlet of a culvert.

BACKGROUND

As an important part of urban underground rainwater drainage system, the drainage culvert plays an important role in the urban flood control and drainage. However, due to the input of a large number of people in the urbanization process, the existing drainage facilities fail to meet the increasing requirement, which causes the occurrence of a large amount of mixed rainwater and sewage, thus resulting in the deterioration of water quality of the downstream river.

Generally, the sewage in the culvert is mainly collected into the municipal sewage pipeline by the downstream interception method when the separation of rainwater and sewage is not completed in the upstream. However, this method will bring rainwater overflow during the rainy season, and the overflowed rainwater can carry a large amount of sewage into the river since the rainwater cannot enter the downstream sewage pipe, causing the pollution of the river. In addition, the river water will be poured back into the municipal sewage pipe through the interception facility when the water level of the river is too high, which will greatly affect the municipal sewage collection system. Therefore, the complete separation of the rainwater and sewage in the culvert will significantly improve the water quality of the downstream river and the culvert itself.

Currently, there are many methods for modifying the diversion of rainwater and sewage in residential areas. Generally, the site where the rainwater and sewage converge can be quickly determined because there are manholes provided on the pipelines in the residential district. However, since most of the culverts are completely closed and their internal conditions are extremely complicated, it is difficult to determine the drainage situation inside the culvert aboveground. Therefore, some special devices such as robots are of great importance for the determination of the drainage situation inside the culvert.

After the drainage situation of the culvert is figured out, how to determine the position of the outlet of the mixed rainwater and sewage become another important problem to be solved. Moreover, the determination of the type of the outlet will directly affect the subsequent overall remediation. Generally, it is required to trace the pollution and locate the pollution source in regard to the outlet with mixed rainwater and sewage. Therefore, it is of great significance for the modification of the culvert outlet to develop a reasonable and feasible method for tracing the pollution.

SUMMARY

An object of this application is to provide a process for inspecting the outlet of the culvert and a method for tracing pollution at outlet. This method can be used in the inspection to systematically analyze the internal drainage facilities of the culvert before modifying the outlet of the culvert. The type of the outlet is determined by this process according to the analysis results, and in regard to the outlets involving mixed rainwater and sewage, the pollution source can be tracked and located, which provides sufficient and accurate information for subsequent engineering to ensure that the expected design and construction quality can be achieved.

The technical solutions of this application are described as follows.

A method for tracing pollution at a drainage outlet of a culvert, comprising:

(1) acquiring main line information of the culvert, wherein the main line information comprises a three-dimensional image of the culvert, coordinates, size and elevation of the outlet, and whether there is sewage flowing out from the drainage outlet;

(2) subjecting the main line information of the culvert to statistical analysis to determine a type of the drainage outlet, thereby determining whether there is mixed rainwater and sewage at the drainage outlet; and (3) if there is mixed rainwater and sewage at the drainage outlet of the culvert, tracing the pollution to locate a source of the pollution.

A safety assessment is performed on the culvert by the inspection robot before step (1), and whether to perform step (1) is determined based on results of the safety assessment.

In some embodiments, the safety assessment includes preliminary exploration of the length of the main line of the culvert and identification of risk factors such as operation in the limited space of the culvert, internal siltation of the culvert and distribution of toxic gases in the culvert. The internal siltation of the culvert includes the depth of silt in the culvert, the water level and the catchment range. The culverts that meet the requirements of safety assessment are subjected to the subsequent test. Auxiliary measures are taken for the culvert that does not meet the requirements of safety assessment, and a secondary safety assessment is conducted after the auxiliary measures are completed.

In some embodiments, in step (1), the main line information of the culvert includes the three-dimensional structure information of the culvert. The three-dimensional structure information of the culvert includes the three-dimensional coordinates of each point of the culvert. The information of all drainage outlets in the culvert is collected, where the information includes, but is not limited to, size, material of the pipeline at the upstream of the outlet, vertical height of the outlet and video data of the outlet. In addition, water sample information can be collected for outlets with fluid flow, and the fluid is measured for the flow.

In step (1), the unmanned inspection device used for collecting the detection information can be an inspection robot, which includes a power module, a three-dimensional laser scanning module, a image collection module, a water quality online detection module, a collection module, a storage module, an analysis module, a wireless communication module and a positioning module; the power module is configured to provide power for the inspection robot; the three-dimensional laser scanning module is configured to perform panoramic three-dimensional laser scan on an interior of the culvert and the drainage outlet of the culvert; the image collection module is configured to image the interior of the culvert and the drainage outlet of the culvert; the water quality online detection module is configured to perform online data detection on water at the interior of the culvert and the drainage outlet of the culvert; the water quality online detection module includes, but is not limited to, oxidation-reduction potential probes, dissolved oxygen detection probes and ion probes, which can detect water samples quickly; the collection module is configured to collect water samples from the interior of the culvert and the drainage outlet of the culvert, and the collected water samples can be taken out after the detection is completed for detailed detection; the storage module is configured to store laser scanning data obtained by the three-dimensional laser scanning module, image data obtained by the image collection module, and detection data obtained by the water quality online detection module in real-time; the analysis module is configured to extract the image data obtained by the image collection module and the detection data obtained by the water quality online detection module, analyze and process the water quality and water volume of the water collected from the culvert and the drainage outlet of the culvert and image data, and determine the type of drainage outlet and store the processing result in the storage module; the wireless communication module is configured to send information of the type of the drainage outlet to an operator in real-time, thus realizing manual operation of the inspection robot for inspection; the inspection robot also includes a positioning module, wherein the positioning module includes a Beidou positioning module and a GPS positioning module for positioning the inspection robot and all drainage outlets.

In some embodiments, in step (2), the data information collected by the unmanned inspection device includes the water flow, water quality, image data, size and coordinate points, and other data information of all drainage outlets of the culvert.

The image data obtained by the image collection module and the detection data obtained by the water quality online detection module are extracted and compared through the analysis module of the inspection robot. The outlet is determined to be an undetermined outlet when there is no water flowing out of the outlet in the collected image data. The flow and water quality are preliminarily tested when there is water flowing out of the outlet in the collected image data information, and the type of the outlet is determined through the analysis module. Specifically, the outlet is determined to be an outlet with suspected rainwater-sewage connection when the detected water quality is lower than the set value and the water flow is higher than the set value; the outlet is determined to be an outlet with rainwater-sewage connection when the detected water quality is higher than the set value; and the outlet is determined to be an outlet with heavy rainwater-sewage connection when the detected water quality and water flow are both higher than their respective set values. The outlet with suspected rainwater-sewage connection, rainwater-sewage connection or heavy rainwater-sewage connection needs to experience the next process to trace the pollution.

In some embodiments, when the drainage outlet is determined to be the outlet with suspected rainwater-sewage connection, the outlet with rainwater-sewage connection or the outlet with heavy rainwater-sewage connection in step (2), the position data information of the outlet that is required to be traced for the pollution is determined by the positioning module of the inspection robot based on the image data of the outlet, the water sample detection result, the outlet data information and the coordinate data information according to step (3). The outlet is positioned on the ground according to the position data information, and if there is no manhole on the ground, the ground is dug according to the elevation, coordinates and length information. The specific steps are described as follows:

(31): detecting the pipelines connecting the manhole and the drainage outlet through the three-dimensional laser scanning module and the image collection module of the inspection robot when the three-dimensional laser scanning module and the image collection module of the inspection robot detect that there is no flow at the manhole; determining the position of the source of the pollution through the positioning module of the inspection robot, and sending the position of the source of the pollution to the operator through the wireless communication module; and when there is a flow in the manhole detected by the three-dimensional laser scanning module and the image collection module, proceeding to step (32);

(32): comparing, by the analysis module, the flow at the manhole with the flow at the drainage outlet; and if the flow at the manhole is less than the flow at the drainage outlet, detecting, by the three-dimensional laser scanning module and the image collection module, the pipelines connecting the manhole and the drainage outlet; determining the position of the source of the pollution through the positioning module of the inspection robot, and sending, by the wireless communication module, the position of the source of the pollution to the operator; when the flow at the manhole is consistent with or close to the flow at the drainage outlet, proceeding to step (33);

(33): detecting, by the inspection robot, a flow of a previous manhole connected to the manhole through pipelines; and if the previous manhole is a starting manhole at a pipeline communicating the drainage outlet, detecting, by the water quality online detection module, water in the starting manhole; determining, by the positioning module, the position of the source of the pollution; sending, by the wireless communication module, the position of the source of the pollution to the operator; and proceeding to step (34); or if the previous manhole is not the starting manhole, proceeding to step (31);

detecting the pipelines connecting the manhole and the previous manhole through the three-dimensional laser scanning module and the image collection module of the inspection robot when the three-dimensional laser scanning module and the image collection module of the inspection robot detect that there is no flow at the previous manhole; determining the position of the source of the pollution through the positioning module of the inspection robot, and sending the position of the source of the pollution to the operator through the wireless communication module; and when there is a flow in the previous manhole detected by the three-dimensional laser scanning module and the image collection module, proceeding to step (32); if the flow at the previous manhole is less than the flow at the manhole, detecting, by the three-dimensional laser scanning module and the image collection module, the pipelines connecting the manhole and the previous manhole; determining the position of the source of the pollution through the positioning module of the inspection robot, and sending, by the wireless communication module, the position of the source of the pollution to the operator; when the flow at the drainage outlet is consistent with or close to the flow at the manhole, detecting, by the water quality online detection module, water in the manhole; proceeding to step (33) (when the flow at the previous manhole is consistent with or close to the flow at the manhole or the flow at the previous manhole is consistent with or close to the sum of the external water flow in the pipeline, the previous manhole is taken as the starting point to continue the tracing; if the previous manhole is the starting manhole, water in the starting manhole is detected by the water quality online detection module); determining, by the positioning module, the position of the source of the pollution; sending, by the wireless communication module, the position of the source of the pollution to the operator; proceeding to step (34); and if the previous manhole is not the starting manhole, proceeding to Step (31); and S34: ending.

In some embodiments, the drainage outlets with rainwater-sewage connection are modified, and whether there is mixed rainwater and sewage at the modified outlets of the culvert is verified using the inspection robot according to steps (1)-(3). The modification of the outlet is considered to be completed when the outlet is determined to be not any one of the outlet with suspected rainwater-sewage connection, the outlet with rainwater-sewage connection and the outlet with heavy rainwater-sewage connection according to the comparison data obtained by the analysis module.

Compared to the prior art, this application has the following beneficial effects.

1. The method provided herein provides a feasible method for the current culvert governance in the water environment rectification and fills the gap in the current culvert governance in the field of water environment remediation in China. The detection method of this application can provide relatively complete data information of culvert and drainage outlet for the design and construction party, providing a basis for the subsequent design and implementation. The method can also be used in the inspection and acceptance of the modified culverts.

2. This application further provides a method for data collection and type determination of culvert outlets. The type of outlets can be quickly determined through an inspection device and related modules carried therein, which provides accurate and reliable data for subsequent tracing of the pollution of the outlet.

3. This application further provides a method for rapidly tracing the pollutant, which provides reliable reference for the modification, construction and maintenance of the outlets with rainwater-sewage connection.

4. The culvert inspection process and the method for tracing the pollution provided herein are not limited to being applied to the culvert inspection, and can also be applied to the modification of the pipe network with mixed rainwater and sewage.

DETAILED DESCRIPTION OF EMBODIMENTS

The application will be further described below in detail with reference to the accompanying drawings and the embodiments. It should be understood that these embodiments are merely illustrative of the disclosure, and are not intended to limit the scope of the disclosure.

Figure 1:
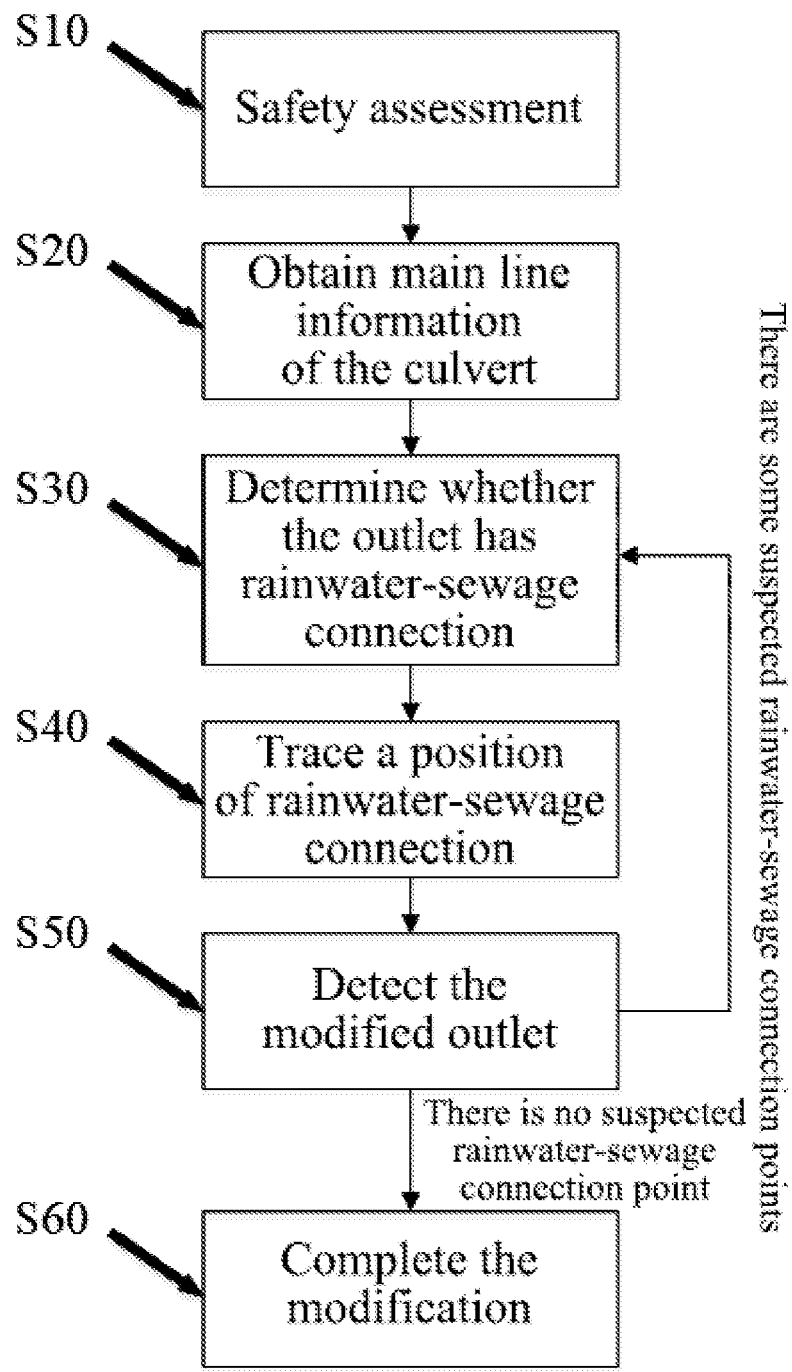
FIG. 1 is a main flow chart of a method for tracing pollution source of a culvert according to an embodiment of the disclosure.

As shown in FIG. 1, this application provides a method for tracing pollution of the drainage outlet of the culvert, which is specifically described as follows.

Step (10): Safety Assessment

The risk factors in the culvert to be detected should be identified before the culvert inspection. The indexes involved in the safety assessment include, but are not limited to, the stability of the upper structure of the culvert, the siltation situation in the culvert, the toxic gas in the culvert, the depth of water in the culvert, the catchment time in the rainy season, the peak discharge, the situation of escape channels, etc. Corresponding safety or engineering auxiliary measures can be taken according to the evaluation results, and whether to proceed to the next step can be determined by comprehensive scoring.

When meeting the following conditions: (1) there are no major structural defects; (2) the toxic gas level is lower than the safety value; (3) the water depths lower than the safety value; (4) the catchment time is shorter than the safety value; (5) the peak discharge is lower than the safety value; and (6) a length of the escape channel is less than the safety value, the culvert is considered to meet the safety assessment requirements and subjected to the subsequent inspection, where the safety values can be adjusted according to the actual external situation.

Step (20) Detection of the Main Line of the Culvert and Acquisition of the Outlet Data Using an Inspection Robot After meeting the requirements in the previous step, the main line information of the culvert is detected and the outlet data is obtained. The information of the culvert from the starting point to the end point is obtained through the inspection robot, which includes length, section size, internal image data, information of the outlet, the flow data information, the three-dimensional coordinate points, the material of the pipe at the upstream of the outlet, the image of the outlet and the elevation and size of the outlet. The information is used to determine the type of the drainage outlet in S30.

Figure 2:
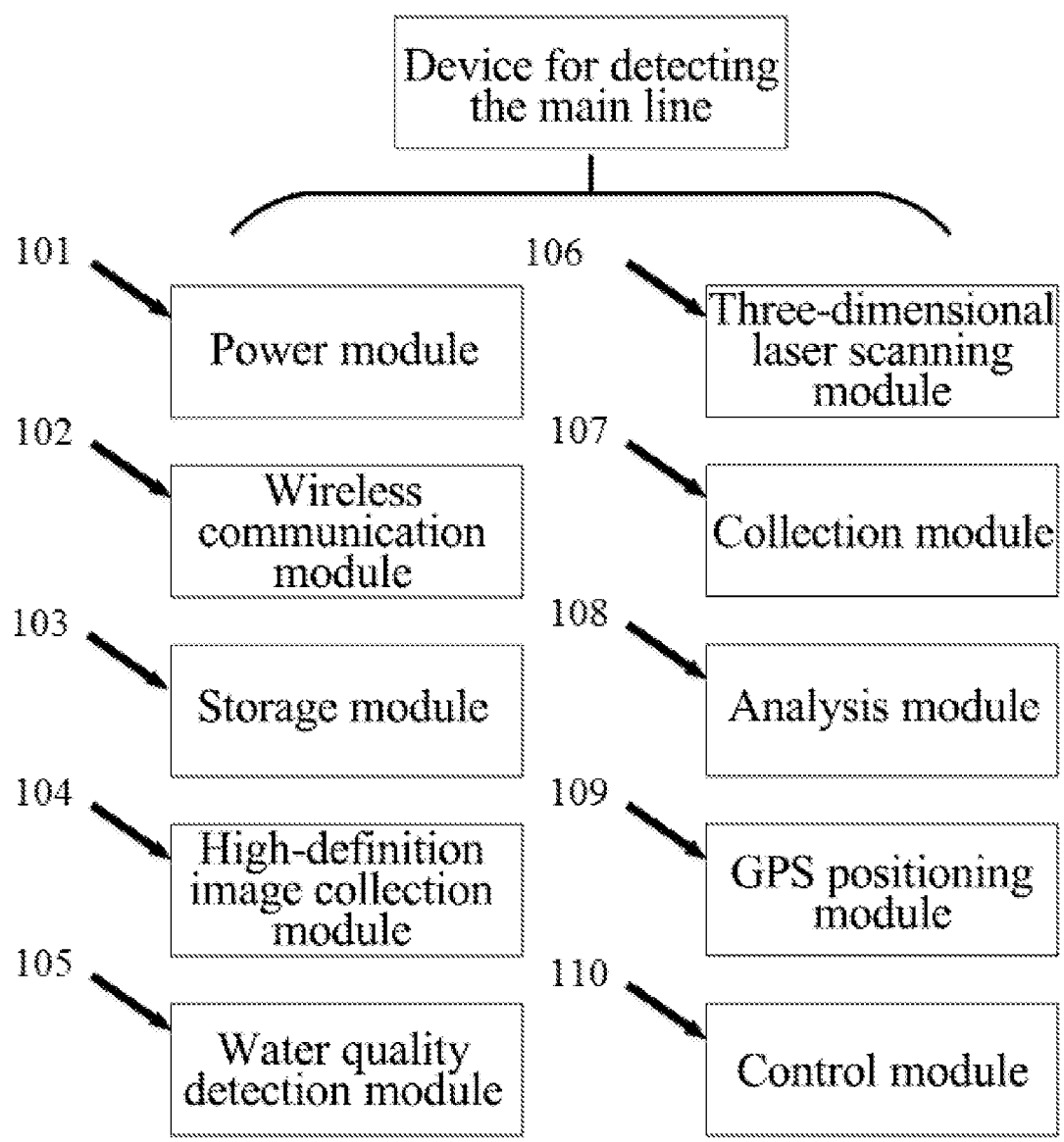
FIG. 2 is a schematic diagram of an unmanned inspection device according to an embodiment of the disclosure.

This application further provides a culvert inspection robot, which is structurally shown in FIG. 2. The culvert inspection robot includes a power module 101, a wireless communication module 102, a storage module 103, a image collection module 104, a water quality online detection module 105, a three-dimensional laser scanning module 106, a collection module 107, an analysis module 108, a GPS positioning module 109, and a control module 110.

The power module 101 is configured to provide power for an unmanned inspection device. In some embodiments, the power module 101 includes, but is not limited to, wheel-type traveling equipment, crawler-type traveling equipment, marine propeller-type traveling equipment and unmanned aerial vehicle-mounted traveling equipment. The power module 101 receives the signal sent by the external control module 110 by the wireless communication module 102 arranged in the device, and the travel distance and location can be manually controlled by an operator on the ground. The operator can control the travel direction of the inspection device by the control module 110 on the ground. The inspection device is also provided with a three-dimensional laser scanning module 106. The operator can send a start signal according to the control module 110 to start the three-dimensional laser scanning in the culvert. The information including three-dimensional coordinates of the culvert can be collected and transferred to the storage module 103 by three-dimensional laser scanning module 106.

The culvert inspection device is also provided with an image collection module 104 equipped with image-assisting equipment such as LED, and a zoom camera. The image collection module 104 can start the imaging according to the instruction signal issued by the control module 110, and send the image data back to the control module 110 in real time by the wireless communication module 102. The photography mode can also be started according to the instruction signal from the control module 110, and the captured image data information is stored in the storage module 103. The image collection module 104 can receive the data from the analysis module 108, and when there is moving image data, the photo is automatically taken and stored, thus collecting and storing the information of the liquid at the drainage outlet in time.

The water quality detection module 105 includes online water sample detection equipment, which includes, but is not limited to, online oxidation-reduction potential probes, online dissolved oxygen detection probes and ion detection probes. The water quality detection module 105 can detect the water from the drainage outlet online according to the start instruction of the control module 110, and store the detection result in the storage module 103. When the water quality detection module 105 is activated, the image collection module 104 is automatically started to collect the image data.

The collection module 107 includes a water sample collection module and a container. The water sample collection is started according to the instruction signal sent by the control module 110, and the collected samples are stored in the container. The water sample collection includes, but is not limited to, extraction.

The inspection device is further equipped with a GPS positioning module 109 to locate the inspection device in real time, and send positioning information to the control module 110 by the wireless communication module 102. The GPS positioning module 109 is automatically started when the image collection module 104 and the three-dimensional laser scanning module 106 are started, which is used for secondary correction and collection of coordinate information.

The type of the drainage outlet is preliminarily determined through a program of the analysis module 108 according to the data information collected by the image collection module 104, the water quality detection module 105 and the three-dimensional laser scanning module 106, and then the analysis module 108 stores information of the drainage outlet and the type in the storage module 103 for subsequent data extraction.

Figure 3:
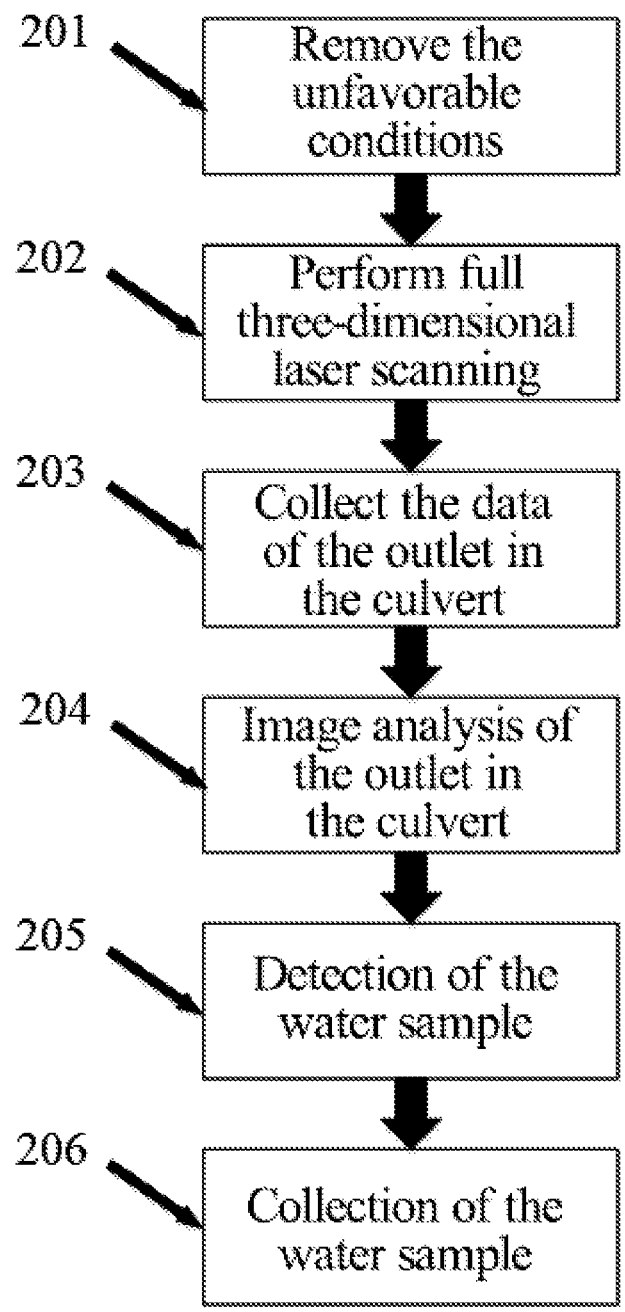
FIG. 3 schematically shows a process for obtaining main line information of the culvert according to an embodiment of the disclosure.

As shown in FIGS. 1 and 3, in the acquisition of the main line information of the culvert in step 20, this application also sets the process of obtaining related information using the culvert inspection device.

S201 Exclusion of External Factors

It is required to exclude the unfavorable conditions based on the safety assessment of S10 before the inspection, where the exclusion of the unfavorable conditions includes, but is not limited to, structural repairing, desilting, ventilation, dredging and drainage, hole opening and arrangement of emergency escape channels.

S202 Three-Dimensional Laser Scanning

The inspection device is manually controlled to travel and to perform the three-dimensional laser scanning on the culvert.

S203 Collection of Data of Drainage Outlet of the Culvert

The corresponding data information is collected after the drainage outlet is found in the captured image data information.

S204 Analysis of Image of Drainage Outlet

The image data of the drainage outlet is collected by the image collection module 104.

S205 Water Sample Detection

The water flowing out of the drainage outlet is detected.

S206 Water Sample Collection

The water flowing out of the drainage outlet is collected and stored.

Figure 4:
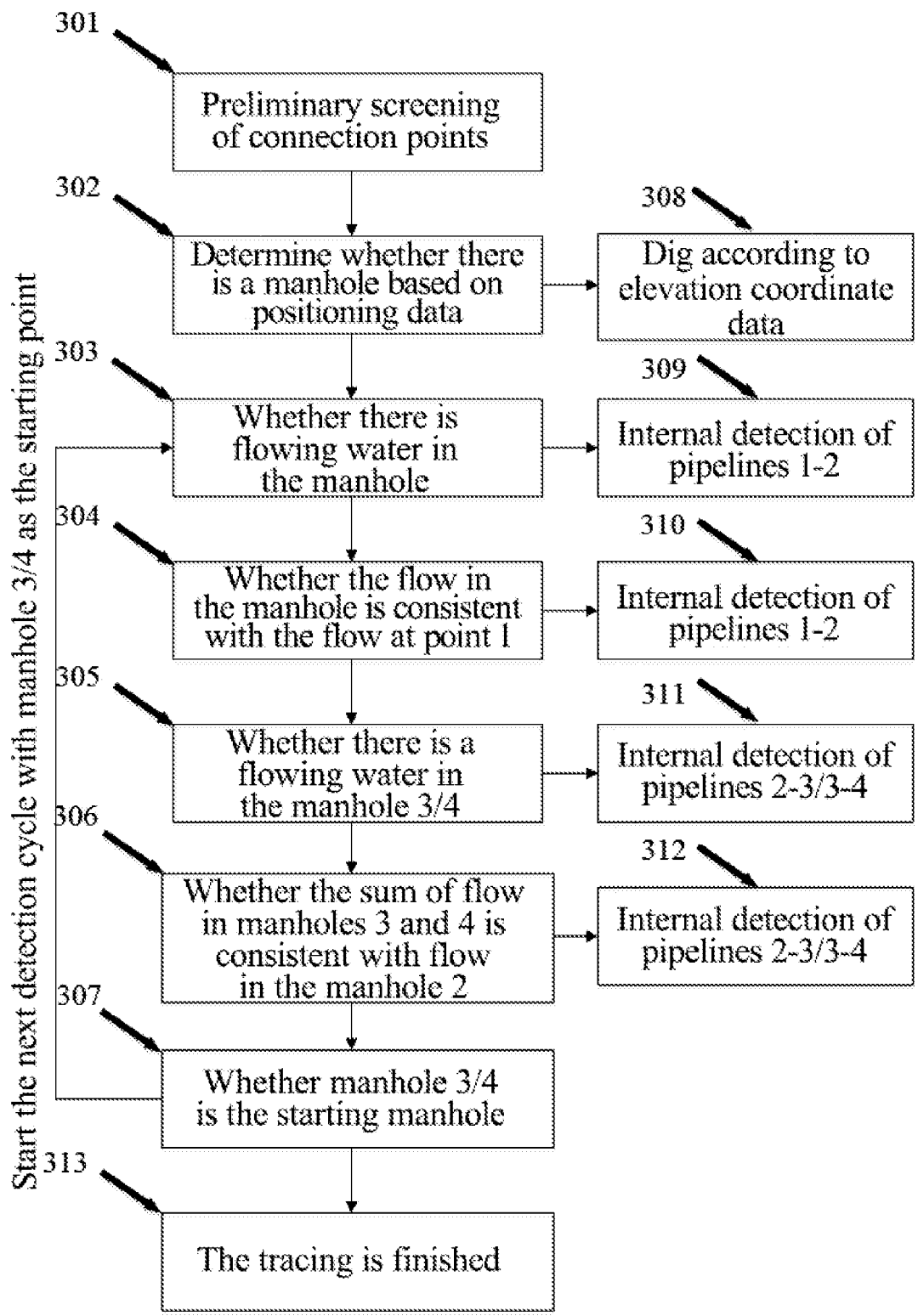
FIG. 4 is a flow chart of a method of tracing pollution sources of the outlet according to an embodiment of the disclosure.
Figure 5:
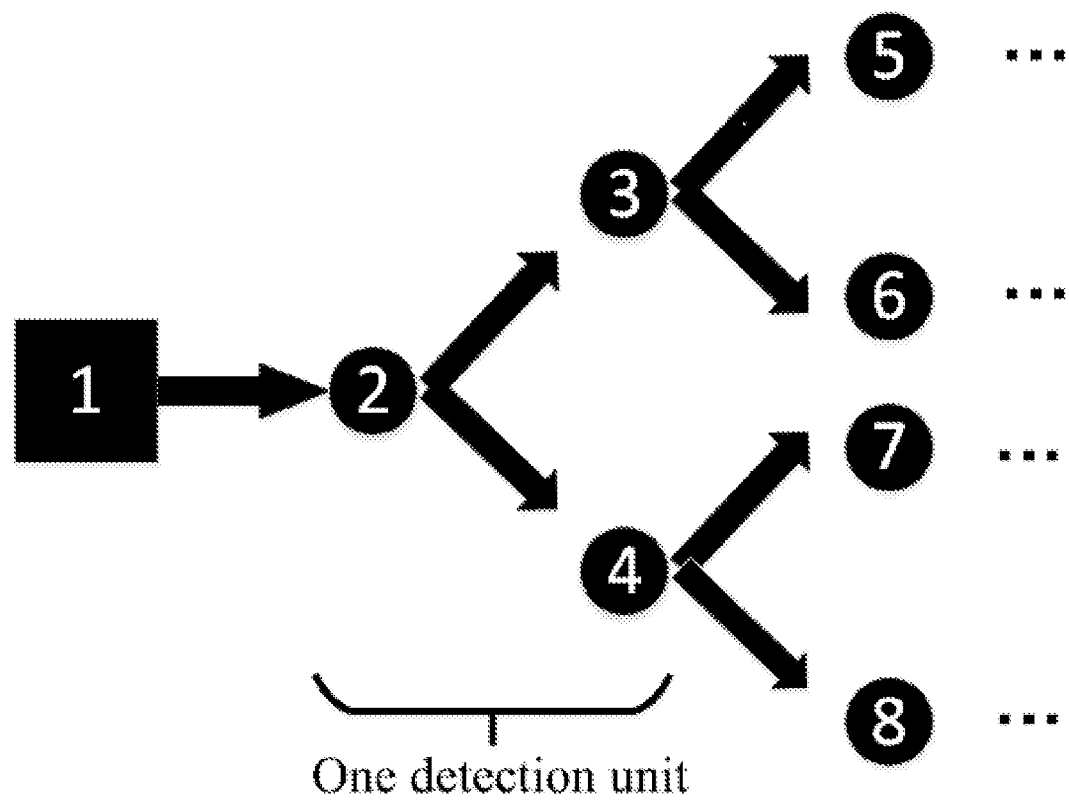
FIG. 5 schematically shows the tracing process of pollution sources of the outlet according to an embodiment of the disclosure.

As shown in FIGS. 1 and 4, for the tracing of pollution at the connection point in step (40), this application also provides a method for tracing the pollution at the drainage outlet, which will be described below with reference to embodiments and FIGS. 4 and 5.

The water sample detection result is obtained using the inspection robot according to the data information obtained in S205 and S206.

S301 The type of the drainage outlet is preliminarily analyzed to determine whether the drainage outlet is required to be traced for the pollution.

S302 Whether there is a manhole is determined according to the coordinate point in the positioning data of the inspection robot, and then whether there is a manhole on the ground corresponding to the coordinate point is determined. If there is no manhole, S308 is executed to perform digging according to the elevation coordinate data to find the pollutant source or the previous communicating manhole. If there is a manhole, S303 is performed to determine whether there is a flow in the manhole by the three-dimensional laser scanning module 106 and image collection module 104 of the inspection robot. When the three-dimensional laser scanning module 106 and the image collection module 104 of the inspection robot do not detect the flow in the manhole, S309 is performed by the three-dimensional laser scanning module 106 and the image collection module 104 to detect pipelines connected between the manhole and the drainage outlet to locate the source of the pollution by the positioning module and send the position of the source of the pollution to the operator by the wireless communication module of the inspection robot. When a flow is detected in the manhole by the three-dimensional laser scanning module 106 and the image collection module 104, S304 is performed by the analysis module 108 to determine whether the flow at the manhole is consistent with the flow at the drainage outlet. If the flow at the manhole is inconsistent with the flow at the drainage outlet, the pipelines connected between the manhole and the drainage outlet are detected by the three-dimensional laser scanning module 106 and the image collection module 104. The position of the pollution source is determined by the positioning module of the inspection robot, and sent to the operator by the wireless communication module. S303 is repeated to trace the pollution. When the flow at the manhole is consistent with or close to the flow at the drainage outlet, it is not necessary to detect the pipeline between the manhole and the drainage outlet, and the three-dimensional laser scanning module 106 and the image collection module 104 are directly used to detect one or more previous manholes connecting with the manhole. S305 is performed to determine whether there is a flow in the one or more manholes. If the three-dimensional laser scanning module 106 and the image collection module 104 detect that there is no water flow in the manholes, S311 is performed to detect the pipelines between the manholes by the three-dimensional laser scanning module 106 and the image collection module 104 to determine position of the pollution source by the positioning module, which is further sent to the operator by the wireless communication module. Whether the flow of the previous manhole or the sum of flow of the multiple manholes is consistent with or close to the flow of the manhole at the front end is determined when there is a flow in the manhole. If the flow of the previous manhole or the sum of flow in the multiple manholes is consistent with or close to the flow of the manhole at the front end, S303 is continuously performed to trace the pollution of the previous manhole or multiple manholes. When there is a large difference between the flow of the previous manhole or the sum of flow in the multiple manholes and the flow of the manhole at the front end, S311 is performed to detect the pipelines between the previous manhole and the manhole or the pipelines between the multiple manholes to determine the pollution source. When there is merely a small difference between the flow of the previous manhole or the sum of flow in the multiple manholes and the flow of the manhole at the front end, water in the previous manhole or multiple manholes is detected by the online water quality detection module of the inspection robot, and S303 is performed to trace the pollution. If there is no pipeline connected to the manhole at the upstream, S307 is performed by the inspection robot to determine whether the manhole is the starting manhole, and the inspection of this section is completed. When all manholes are the starting manholes, S313 is performed to finish the tracing of the pollution.

The method provided herein for tracing the pollution is described below with reference to embodiments.

A drainage outlet 1 with suspected rainwater-sewage connection is found by the inspection robot, and is determined by the analysis module 108 to have a flow of x. The manhole 2 is found on the ground by the positioning module according to the coordinate data information. A water flow is found in the manhole 2 according to the detection results of the three-dimensional laser scanning module 106 and the image collection module 104, and it is further found by the analysis module 108 that the water flow is consistent with the water flow of the drainage outlet 1 with suspected rainwater-sewage connection. The manhole 2 is observed, through the three-dimensional laser scanning module 106 and the image collection module 104, to be connected to the manhole 3 and the manhole 4 by pipelines. There are water flows in the manhole 3 and the manhole 4, respectively. It is confirmed by the analysis module 108 that the difference between the sum of water flows in manhole 3 and manhole 4 and the water flow in the manhole 2 is less than the set value, so there is no need to detect the pipelines connecting the manhole 2 and the manhole 3 and connecting the manhole 2 and the manhole 4. The manhole 5 and the manhole 6 are found to connect to the manhole 3. The manhole 5 is found to have a water flow and is determined to be the starting manhole. Water in the starting manhole is detected by the water quality online detection module to have abnormal quality, so the detection is finished and a pollution source point 1 is found. As detected by the inspection robot, there is no water flow in the manhole 6, and the inspection for this section is stopped.

Pipelines connecting the manhole 3 and the manhole 6 are detected by the three-dimensional laser scanning module 106 and the image collection module 104, and a pollution source point 2 is found. The water quality in the manhole 4 is detected by the analysis module 108, and a pollution source point 3 is determined. The upstream manholes 7 and 8 connected to the manhole 4 are detected to be the starting manholes. The manhole 7 is detected to have no water flow, and there is a water flow detected in the manhole 8. The water quality in the manhole 8 is detected by the analysis module 108, and a pollution source point 4 is found. As a consequence, a total of 4 pollution source points are determined, and the tracing of the pollution at the drainage outlet 1 with suspected rainwater-sewage connection is finished.

Described above are merely illustrative of the disclosure. It should be understood that any replacement, modification and change made by those skilled in the art without departing from the spirit of the disclosure should fall within the scope of the disclosure.

What is claimed is:

1. A method for tracing pollution at a drainage outlet of a culvert, comprising:
   (1) acquiring main line information of the culvert, wherein the main line information comprises a three-dimensional image of the culvert, coordinates, size and elevation of the drainage outlet, and whether there is sewage flowing out from the drainage outlet;
   (2) subjecting the main line information of the culvert to statistical analysis to determine a type of the drainage outlet, thereby determining whether there is mixed rainwater and sewage at the drainage outlet; and
   (3) if there is mixed rainwater and sewage at the drainage outlet of the culvert, tracing the pollution to locate a source of the pollution;
   wherein in step (1), the main line information of the culvert is acquired by an inspection robot; the inspection robot comprises a power module, a three-dimensional laser scanning module, an image collection module, a water quality detection module, a collection module, a storage module, an analysis module, a wireless communication module and a positioning module; and
   the power module is configured to provide power for the inspection robot; the three-dimensional laser scanning module is configured to perform a panoramic three-dimensional laser scan on an interior of the culvert and the drainage outlet of the culvert; the image collection module is configured to image the interior of the culvert and the drainage outlet of the culvert; the water quality detection module is configured to perform data detection on water at the interior of the culvert and the drainage outlet of the culvert; the collection module is configured to collect water samples from the interior of the culvert and the drainage outlet of the culvert; the storage module is configured to store laser scanning data obtained by the three-dimensional laser scanning module and image data obtained by the image collection module and detection data obtained by the water quality detection module in real-time; the analysis module is configured to extract and compare the image data obtained by the image collection module and the detection data obtained by the water quality detection module, and determine the type of the drainage outlet; the wireless communication module is configured to send information of the type of the drainage outlet to an operator in real-time; and the positioning module is used for positioning the inspection robot;
   in step (2), the drainage outlet is determined to be an undetermined drainage outlet, a drainage outlet with suspected rainwater-sewage connection or a drainage outlet with rainwater-sewage connection by extracting and comparing the image data obtained by the image collection module and the detection data obtained by the water quality detection module through the analysis module;

in step (3), if the drainage outlet is determined to be the drainage outlet with suspected rainwater-sewage connection or the drainage outlet with rainwater-sewage connection, a manhole connected to the drainage outlet with suspected rainwater-sewage connection or the drainage outlet with rainwater-sewage connection through pipelines is detected for flow; flow data obtained at the drainage outlet with suspected rainwater-sewage connection or the drainage outlet with rainwater-sewage connection is compared with that obtained at the manhole, and a position of the manhole is traced according to the comparison result to determine the source of the pollution; and if the drainage outlet is the drainage outlet with suspected rainwater-sewage connection or the drainage outlet with rainwater-sewage connection, the pollution of the drainage outlet with suspected rainwater-sewage connection or the drainage outlet with rainwater-sewage connection is required to be traced;

if the drainage outlet is the drainage outlet with suspected rainwater-sewage connection or the drainage outlet with rainwater-sewage connection, the pollution of the drainage outlet with suspected rainwater-sewage connection or the drainage outlet with rainwater-sewage connection is traced through steps of:

(31) detecting the pipelines connecting the manhole and the drainage outlet with suspected rainwater-sewage connection or the drainage outlet with rainwater-sewage connection through the three-dimensional laser scanning module and the image collection module of the inspection robot when the three-dimensional laser scanning module and the image collection module of the inspection robot detect that there is no flow at the manhole; determining the position of the source of the pollution through the positioning module of the inspection robot, and sending the position of the source of the pollution to the operator through the wireless communication module; and when there is a flow in the manhole detected by the three-dimensional laser scanning module and the image collection module, proceeding to step (32);

(32) comparing, by the analysis module, the flow at the manhole with the flow at the drainage outlet with suspected rainwater-sewage connection or the drainage outlet with rainwater-sewage connection; and if the flow at the manhole is inconsistent with the flow at the drainage outlet with suspected rainwater-sewage connection or the drainage outlet with rainwater-sewage connection, detecting, by the three-dimensional laser scanning module and the image collection module, the pipelines connecting the manhole and the drainage outlet with suspected rainwater-sewage connection or the drainage outlet with rainwater-sewage connection; determining the position of the source of the pollution through the positioning module of the inspection robot, and sending, by the wireless communication module, the position of the source of the pollution to the operator; or if the flow at the manhole is consistent with the flow at the drainage outlet with suspected rainwater-sewage connection or the drainage outlet with rainwater-sewage connection, detecting, by the water quality detection module, water in the manhole, and proceeding to step (33);

(33) detecting, by the inspection robot, a flow of a previous manhole connected to the manhole through pipelines; and if the previous manhole is a starting manhole at a pipe line connecting the drainage outlet with suspected rainwater-sewage connection or the drainage outlet with rainwater-sewage connection, detecting, by the water quality detection module, water in the starting manhole; determining, by the positioning module, the position of the source of the pollution; sending, by the wireless communication module, the position of the source of the pollution to the operator; and proceeding to step (34); or if the previous manhole is not the starting manhole, proceeding to step (31); and (34): ending.

2. The method of claim 1, further comprising:

if the drainage outlet is the drainage outlet with rainwater-sewage connection, modifying the drainage outlet with rainwater-sewage connection, and determining, by the inspection robot according to steps (1)-(3), whether the modified drainage outlet is the drainage outlet with suspected rainwater-sewage connection or the drainage outlet with rainwater-sewage connection; and if it is determined according to comparison results obtained by the analysis module of the inspection robot that the modified drainage outlet is neither the drainage outlet with suspected rainwater-sewage connection nor the drainage outlet with rainwater-sewage connection, verifying that the modification of the drainage outlet with suspected rainwater-sewage connection or the drainage outlet with rainwater-sewage connection is completed.

3. The method of claim 1, further comprising:

before step (1), performing a safety assessment on the culvert by the inspection robot, and determining whether to perform step (1) based on results of the safety assessment.

4. The method of claim 3, wherein the safety assessment of the culvert comprises identification and determination of depth of silt, water level and catchment range in the culvert.

5. A method for tracing pollution at a drainage outlet of a culvert, comprising:

(1) acquiring main line information of the culvert, wherein the main line information comprises a three-dimensional image of the culvert, coordinates, size and elevation of the drainage outlet, and whether there is sewage flowing out from the drainage outlet;

(2) subjecting the main line information of the culvert to statistical analysis to determine a type of the drainage outlet, thereby determining whether there is mixed rainwater and sewage at the drainage outlet; and (3) if there is mixed rainwater and sewage at the drainage outlet of the culvert, tracing the pollution to locate a source of the pollution;

wherein the method further comprises:

before step (1), performing a safety assessment on the culvert by the inspection robot, and determining whether to perform step (1) based on results of the safety assessment; and the safety assessment of the culvert comprises identification and determination of depth of silt, water level and catchment range in the culvert.

* * * * *